(No Model.)
A. JUDSON.
COVER FOR CHAMBER PAILS, &c.
No. 312,998. Patented Feb. 24, 1885.
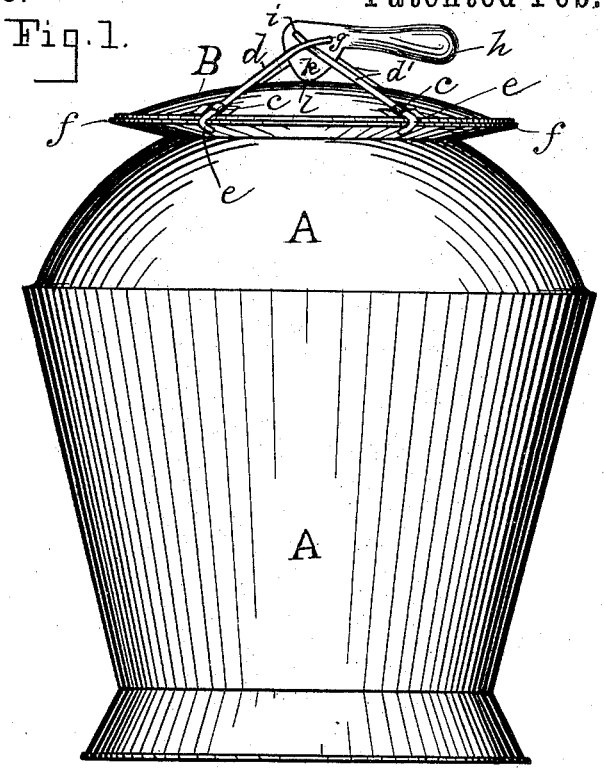
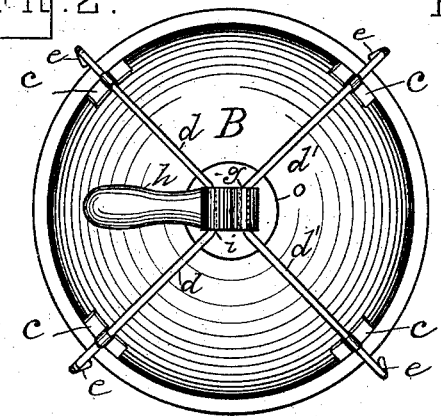
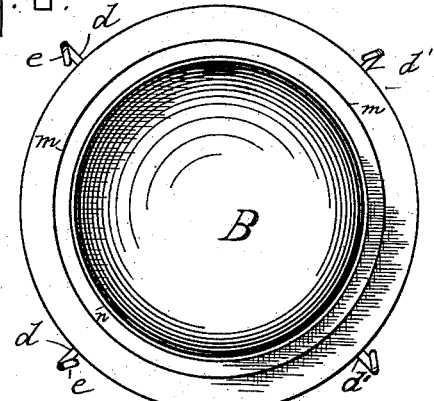
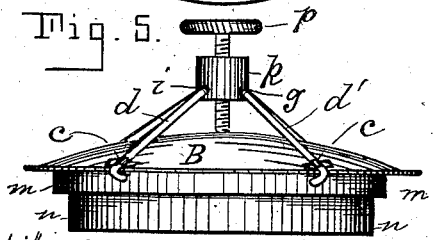
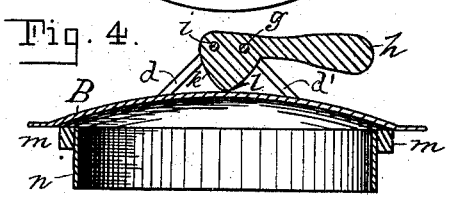
Witnesses:
Percy White.
Chas. R. Abell.
Inventor:
Agur Judson
By John J. Halsted & Son Attys

UNITED STATES PATENT OFFICE.

AGUR JUDSON, OF NEWARK, NEW JERSEY, ASSIGNOR OF ONE-HALF TO FRANK M. KUMMER, OF SAME PLACE.

COVER FOR CHAMBER-PAILS, &c.

SPECIFICATION forming part of Letters Patent No. 312,998, dated February 24, 1885.

Application filed December 15, 1884. (No model.)

*To all whom it may concern:*

Be it known that I, AGUR JUDSON, of Newark, in the county of Essex and State of New Jersey, have invented certain new and useful Improvements in Covers for Chamber-Pails and Similar Articles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My improvement has for its object the application to the outside of the cover of a chamber-pail of special devices whereby the cover may be easily fastened down tightly upon or removed from the pail, the cover on its under side being of the ordinary construction, the device serving to confine all the bad odors within the vessel and permitting the cover to be readily cleansed.

In the drawings, Figure 1 is a front elevation of the pail with the cover secured or locked thereon; Fig. 2, a detached view of the cover with the locking device unlocked; Fig. 3, an under side view of the cover, and Fig. 4 a section of the cover; and Fig. 5 shows a modification.

A represents a pail or vessel, and B the cover, which, until my novel devices are applied, is of ordinary form. On the top of the cover and near its edge I place four guide-eyes, c, about equally distant from each other.

A bent wire or rod, d, has its two ends passed severally through two of these eyes, as shown, and a similar bent wire, d', has its ends passed through the other two eyes, c. All four ends of these wires are bent downward into the form of a hook, e, adapted to clasp the rim f of the pail or other vessel to which the cover may be applied. The middle part of one of these wires passes through a hole, g, in a locking-lever, h, and the middle part of the other wire passes through another hole, i, in the same lever. This lever has a cam projection, k. When this lever is in the position shown in Fig. 2, the hooks e do not clamp and hold upon the rim f; but when the lever is swung over to the position opposite to that shown in Fig. 2 the center of each wire is drawn so as to pass and cross the other one, thus pulling up the hooks under the rim f of the vessel, as shown in Fig. 1. The same action not only brings the projecting edge l of cam k beyond what may be termed the "dead-point," and so that the pull of both wires tends to keep the device locked, but it performs another equally important duty of forcing downward the cover closely upon the vessel, or against an elastic rubber or other ring, m, placed around the inner rim or band, n, of the cover, thus insuring the positive confinement of all odors within the vessel and preventing their escape into the room.

If desired, the center of the top of the cover may have a piece of hard metal secured to it, the better to resist the action and pressure of the can. Such a piece is shown at o.

Instead of using the lever h, a screw-thread may be cut through the part k, which connects the rods d d', and a thumb-screw, p, inserted therein. The turning of such screw to the right will bring its end against the top of the cover and pull upward the rods, and clamp the cover to the pail, as heretofore stated, and upon the screw being turned to the left the cover will be released.

It will now be observed that I avoid any inclosed or partially-inclosed chamber or compartment in the cover, and which, when used, not only admits and retains the foul odors which rise from the vessel's contents, but also precludes any possibility of cleansing the interior of such a cover.

My device is perfectly efficient, simple, and cheap, and one understood at a glance by the most ignorant servant.

It will be evident that my improvement is applicable to covers for any class of vessels where it is desirable to confine liquids or prevent the escape of odors, whether fair or foul.

I claim—

1. In combination with the cover B, the guide-eyes $c$ on its top, and the hooked bent rods $d\ d'$, arranged to slide through such eyes, and means for actuating them to force the hooks inward or outward, as set forth.

2. In combination with the cover, the hooked and bent wires $d\ d'$, guide-eyes $c$, and lever-cam $h\ k$, the hooks being arranged to clasp the rim of a vessel to which the cover is applied.

AGUR JUDSON.

Witnesses:
JAS. P. RYON,
PERCY WHITE.